Figure 3:
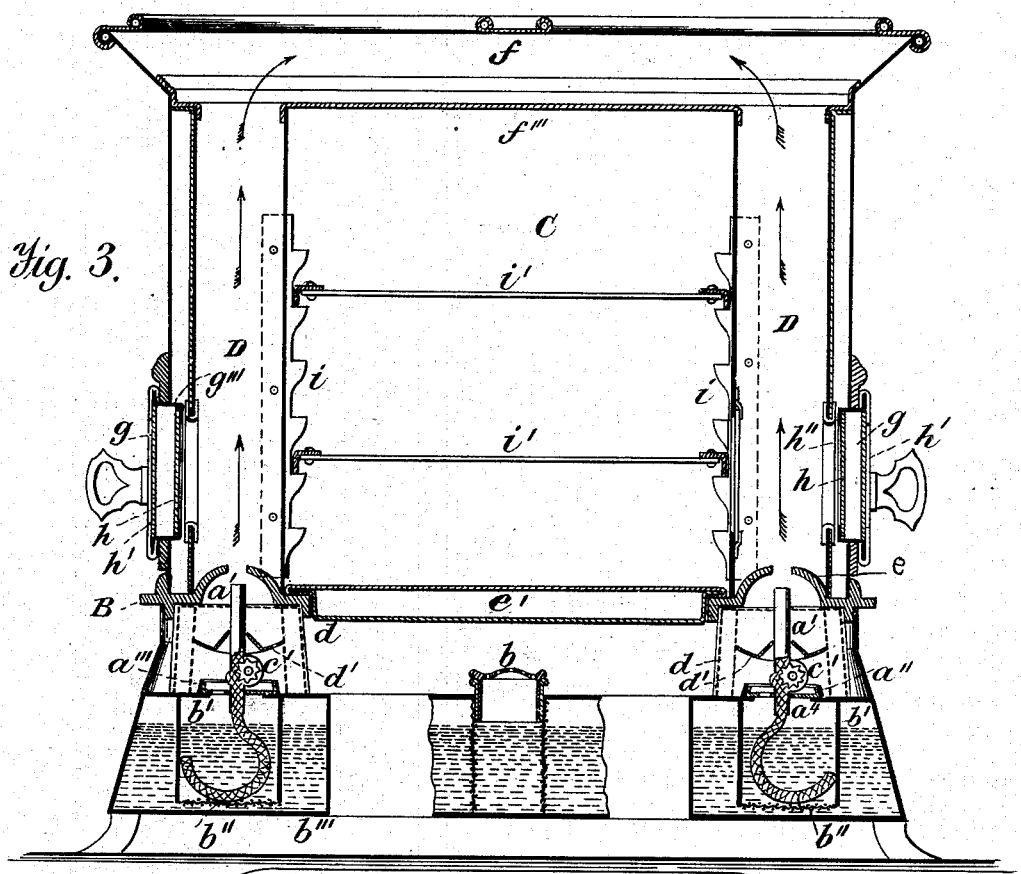

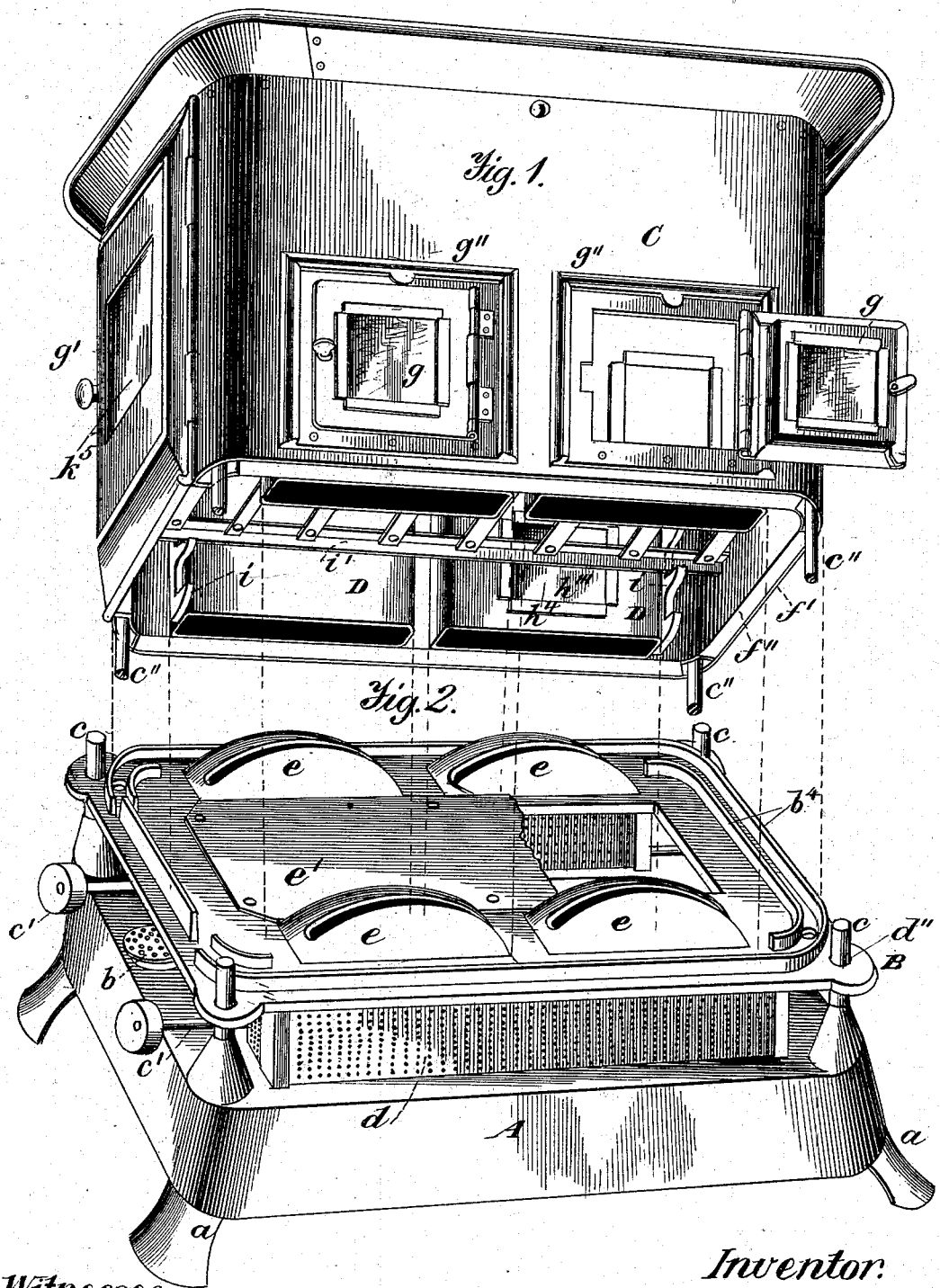

(No Model.) 2 Sheets—Sheet 2.

F. SLOAN.
OIL STOVE.

No. 276,911. Patented May 1, 1883.

Witnesses.
A. Ruppert
W. T. Cole

Inventor:
Frank Sloan,
by Cott W. T. Howard
attys

UNITED STATES PATENT OFFICE.

FRANK SLOAN, OF CHICAGO, ILLINOIS, ASSIGNOR TO THE ADAMS & WESTLAKE MANUFACTURING COMPANY, OF SAME PLACE.

OIL-STOVE.

SPECIFICATION forming part of Letters Patent No. 276,911, dated May 1, 1883.

Application filed February 7, 1883. (No model.)

*To all whom it may concern:*

Be it known that I, FRANK SLOAN, of Chicago, in the county of Cook and State of Illinois, have invented certain new and useful Improvements in Coal-Oil Stoves, of which the following is a specification, reference being had to the accompanying drawings, and to the letters of reference marked thereon.

This invention relates to an oil cooking-stove capable of allowing the various processes of cooking and baking at the same time, and has for its object the production of a compact, light, effective, and cheap stove for domestic use.

In the construction of a stove of this class many considerations must be observed. The stove should be complete in itself and require no special cooking utensils to be used with it, but be adapted for cooking-vessels of any ordinary character. The oil-containing parts of the apparatus should be absolutely guarded from danger of explosion, and the oil holder or lamp protected from undue heat, whether by radiation or conduction. The oil holder or lamp should be insulated from the superstructure or stove proper or heater, and ample egress provided for the escape of the heat and generated gases. Suitable passages or conduits should be furnished for the creation of currents of air required to promote perfect combustion, and the air should be guided or deflected to the flame in a manner to induce an upward flow or current through the burner-plate which will prevent any disturbance of the flame by lateral or other drafts. Each section of the stove should, as far as possible, be independent of the other. The heating area and spaces should be so constructed and distributed that the fullest expenditure of direct and radiated heat from the lamp-flame and the escaping products of combustion shall act upon the articles under process of cooking, whether resting on the upper plate of the stove or within the oven. To effect this there should be as intimate and close an association between the lamp, the chimneys, the oven, and the upper plate as is practicable, and the channels through which the escaping heat and products of combustion pass should be inclosed within the oven, so that there will be a direct vertical escape of the heat through the same.

The oven should have double walls, to prevent radiation of heat, and the bottom of the oven should also be double, having an inclosed dead-air space to prevent downward radiation. By the proper observance of such considerations the maximum of heating effect and complete absence of smell of smoke will be attained, and the oil holder or lamp preserved in a cool and safe condition. Other details of construction should be followed. There should be such provision made that at a time when cooking-vessels are placed upon all the openings of the top plate combustion may not be checked. The interior of the stove should be made visible by the insertion of suitable transparencies in the walls, doors, &c., so that the process of cooking within the oven, the condition of the flame, &c., may be readily observed. Light should be thrown from the flame to the oven to aid inspection of the work going on. The upper plate should be furnished with projections, on which the cooking-vessels may rest without checking combustion, and suitable reducing-rings should or may be used whereby to suit the different sizes of cooking-vessels to be used with the stove. All parts of the stove should be under ready and simple control, and capable of being readily detached or reached for purposes of cleaning, &c.

My present invention aims to embody in one structure such features and combinations as will effect the advantageous results above adverted to.

Figure 4:
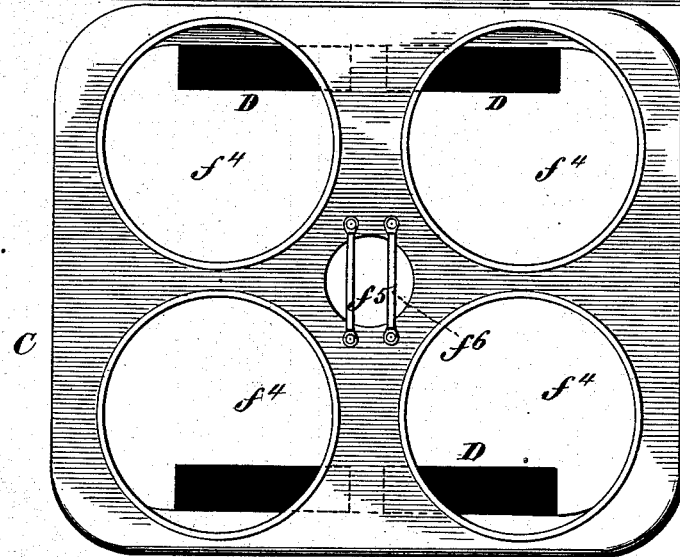

In the accompanying drawings, Figure 1 is a perspective view of the superstructure or stove proper. Fig. 2 is a perspective view of the oil holder or lamp. Fig. 3 is a vertical section of the oil-holder and superstructure or stove complete. Fig. 4 is a top view or plan of the stove.

Similar letters of reference indicate similar parts in the respective figures.

A is the base of the stove, which also constitutes the oil holder and lamp. The base A rests upon feet $a$. The aperture for the admission of oil is shown by $b$. At each corner of the oil-holder is a vertical pin, $c$, on which the lower plate of the stove proper or superstructure fits. The wick-tubes are represented by $a'$, and are secured to plates $a''$, attached to the top of the oil-holder by screws or other means. The plates $a''$ are each surrounded by a flange, $a'''$, projecting from the top of the oil-holder. Under each of the wick-tubes $a'$, and within the oil-holder, is a chamber or well, $b'$, laterally partitioned or divided off from the rest of the interior of the oil-holder, which wells have each a perforated bottom plate, $b''$, elevated a short distance above the floor $b'''$ of the oil-holder. The wick-wheel shafts are shown by $c'$, and are of the ordinary construction. The wicks are separated or isolated from the main body of oil within the oil-holder, oil only being admitted thereto through the perforated bottom plates, $b''$. The object of the chambers or wells $b''$ is to confine the gas generated by each burner from the others, so that one burner may be lighted and the gas generated thereby not escape through other burners not lighted. The base or oil-holder A is made in the form of a quadrangle, having its center open, and a wick-tube is placed as near each corner of the centrally-open quadrangle as is practicable. Each adjacent pair of wick-tubes is surrounded by or inclosed within a box, $d$, removable from the oil-holder, and having double perforated walls and a perforated top, the latter being single and slitted to allow the projection therefrom of the top of the wick-tubes $a'$. The sides may, however, be solid and the top double. Within each of the boxes $d$ is a plate, $d'$, the office of which is to guide the box when slipped over its wick-tube, and also to direct an upward current of air from the lower part of the box to the flame.

The quadrangular and centrally-open base-plate of the superstructure is shown by B. It is provided with vertical projections or ribs $b^4$, which serve to steady the bottom edge of the superstructure. At each corner of the base-plate is a hole, $d''$, which fits over a pin, $c$, of the oil-holder A, by which provision the entire superstructure may be readily lifted from the oil-holder. Instead of securing the base-plate B to the oil-holder in the manner shown, other means may be employed—as hinges, &c. The base-plate B is provided with slotted cones $e$, each of which fits over a wick-tube. The open center of the base-plate B is covered by a plate, $e'$, having double walls forming an interior dead-air space, for a purpose hereinafter referred to.

The superstructure or stove proper consists principally of the base-plate B, the oven C, and the top plate, $f$. The whole is tied together by rods $c''$. In the top plate are provided the holes $f^4$, to receive the various cooking-vessels.

The side walls of the oven C are double, consisting of the outer plate, $f'$, and the inner plate, $f''$. The chimneys or flues are indicated by D, and extend upward from the cones $e$ to the crown $f'''$ of the oven, being riveted or otherwise attached to the inner walls of the oven. The chimneys passing vertically through the oven an effective distribution of heat is produced, and the air-space between the inner and outer walls of the oven prevents in a sensible degree the radiation of heat from the stove, which is an important consideration during the summer months. At the same time the interposed body of hot air prevents the cooling of the oven by the action of drafts to which the stove may be exposed. The outer plate of the oven is furnished with side doors, $g$, and a large end door, $g'$. The side doors, $g$, are surrounded by cast frames $g''$, the doors being hinged to said frames in the ordinary manner. The side doors $g$ are each provided with an inner flange, $g'''$, holding a sheet of mica, $h$, or other transparent substance. A similar transparent sheet, $h'$, is inserted in the outer part of the door. Transparent doors of double thickness are thus formed, and the air confined within the door-space prevents radiation of heat from and detrimental cooling effects upon the stove. An opening, $h''$, is cut in the outside of each of the chimneys D, so that the flame may be observed from the exterior of the stove. Two of the chimneys, at opposite corners of the stove, are provided with similar openings, $h'''$, looking into the oven, which openings are covered with mica plates $h^4$, thus enabling the process of cooking within the oven to be seen. The light from the burners is thus thrown directly into the oven, so as to facilitate the examination of the articles therein. This examination is further facilitated by the insertion of a transparent plate, $h^5$, in the large end door. The openings $h''$ in the outside of the chimneys are not covered with any transparent substance, and on opening the doors opposite said openings the wicks may be trimmed or cleaned. Serrated bars $i$ are riveted to the chimneys, as shown, upon which rest the movable trays or racks $i'$.

The top plate, $f$, of the superstructure is elevated a short distance above the crown $f'''$ of the oven, but is sufficiently near thereto to allow the heat from the flames to impinge effectively upon the lower surfaces of the cooking utensils. The center of the plate $f$ is perforated, as shown at $f^5$, the opening made giving the proper admission of air from below, to prevent the checking of combustion when the several apertures $f^4$ in said plate are covered by cooking utensils. The central opening, $f^5$, is guarded by rods $f^6$. A flanged ring is adapted to fit around any one of the openings $f^4$. The vertical flange of the ring is scalloped, the upturned points constituting a rest for the cooking utensil, and allowing the ingress of air from below to keep up ventilation and sustain combustion. The ring need not be used, and the openings may instead be surrounded by stationary vertical projections of suitable character for the purpose. A reducing-ring may be fitted in any one of the holes $f^4$, to reduce its size for the reception of a smaller utensil than can be placed on the hole $f^4$.

The object of making the oil-holder or base with an open center of extended area being to allow a circulation of air about the body of oil, it is apparent that the equivalent of my preferred construction would be found in an oil-holder of annular or other shape providing an open center of sufficient superficial area. The double plate placed in the open center prevents downward radiation of heat from the oven and assists effectively in maintaining the oil at a low temperature.

I disclaim, generally speaking, the insulation of the wicks from the main body of oil by wells having foraminated side and bottom plates, as also double-walled perforated boxes or air-strainers, to cover or inclose the wick-tubes, whereby to aid in steadying the flame, as also air-deflecting plates within such boxes, these devices being shown and claimed in United States Patent No. 221,206, to J. McGregor Adams, dated November 4, 1879.

I also, in general terms, disclaim a superstructure separable from the oil-holder, flues or chimneys arranged laterally with reference to the oven, double walls for preventing radiation, transparencies variously used with oil-stoves, and divers other details singly considered, but which are combined in my invention in new and operative relation; but

I claim as my invention—

1. A quadrangular centrally-open oil-holder having a well laterally separated from the rest of its interior, but communicating therewith through a perforated bottom plate elevated above the floor of the holder, one of said wells being situated at each of the respective corners of said holder, combined with wick-tubes, one entering each of said wells, and perforated boxes, one fitting over each adjacent pair of wick-tubes, substantially as set forth.

2. In an oil-stove, a centrally-open base-plate of the superstructure, combined with a plate resting independently of and detached from the wick-tubes in the central opening of said base-plate, and having double walls to prevent downward radiation of heat to the oil-holder, substantially as set forth.

3. In an oil-stove, the centrally-open base-plate of the superstructure provided with deflecting-cones, each at a corner of the plate and adapted to fit over one of the wick-tubes, combined with a plate constituting the bottom of the oven, placed detachably in the central opening of the base-plate, substantially as set forth.

4. In an oil-stove, a double-walled oven, combined with chimneys distributed or placed at its respective corners, attached to its inner wall, and passing vertically through the oven, substantially as set forth, heat being thereby disseminated from the lamp effectively and equally throughout the oven.

5. The combination, in an oil-stove, of an oven having double walls to prevent radiation of heat, and chimneys secured to the inner wall of the oven at its respective corners to disseminate, equalize, and intensify the heat throughout the oven, substantially as set forth.

6. The combination, in an oil-stove, of a double-walled oven and chimneys riveted or otherwise secured to its inner wall, the walls of the oven and the outer wall of the chimneys being perforated to allow the flame to be seen and the wick examined and adjusted with facility, as set forth.

7. The combination, in an oil-stove, of a double-walled oven and chimneys riveted or otherwise secured to its inner wall, the walls of the oven and the outer and inner walls of the chimneys being pierced or perforated, substantially as described, whereby the process of cooking going on within the oven may be observed and light thrown from the flame into the oven to facilitate such observation, as set forth.

8. In an oil-stove, the combination of a double-walled oven, chimneys riveted or otherwise secured to its inner wall, and serrated bars riveted to said chimneys for supporting the movable racks or trays, substantially as set forth.

9. In an oil-stove, a double-walled oven, provided with transparent doors hinged thereto, combined with chimneys riveted or otherwise secured to the inner wall of the oven, and having both their outer and inner walls pierced oppositely of the transparent doors of the oven, and transparent plates inserted in their inner walls, substantially as and for the purposes set forth.

10. In an oil-stove, a double-walled oven provided with transparent doors hinged thereto, combined with chimneys riveted or otherwise secured to the inner wall of the oven, the outer walls of the chimneys being perforated oppositely of the transparent hinged doors of the oven, whereby examination or adjustment of the flame is allowed from the exterior of the stove, substantially as set forth.

11. In an oil-stove, the base-plate of the superstructure, the double-walled oven, and chimneys riveted or otherwise attached to the inner wall of the oven, and extending from said base-plate through the oven to and through the crown thereof and distributed at its respective corners, combined with a top plate elevated above the crown of the oven and furnished with openings for the reception of the cooking utensils arranged over the tops of the chimneys, whereby the heat may impinge directly upon said vessels, substantially as set forth.

12. In an oil-stove a quadrangular centrally-open oil-holder having wells at its respective corners and a wick-tube connecting with each well, combined with a double-walled oven having chimneys passing vertically through it, one over each wick-tube, and with a centrally-open cone-plate with double-walled center, forming the bottom of the oven, substantially as set forth.

In testimony whereof I hereunto set my hand this 2d day of February, 1883.

FRANK SLOAN.

Witnesses:
A. WEINBERG,
C. W. TSCHIRCH.